(12) United States Patent
Mitra et al.

(10) Patent No.: US 9,894,412 B2
(45) Date of Patent: Feb. 13, 2018

(54) METHOD AND SYSTEM FOR DETECTION OF TELEVISION ADVERTISEMENTS USING BROADCASTING CHANNEL CHARACTERISTICS

(71) Applicant: Silveredge Technologies Pvt. Ltd., Gurgaon (IN)

(72) Inventors: Debasish Mitra, Gurgaon (IN); Hitesh Chawla, Gurgaon (IN)

(73) Assignee: Silveredge Technologies Pvt. Ltd. (IN)

( * ) Notice: Subject to any disclaimer, the term of this patent is extended or adjusted under 35 U.S.C. 154(b) by 0 days.

(21) Appl. No.: 15/454,701

(22) Filed: Mar. 9, 2017

(65) Prior Publication Data
US 2017/0264951 A1    Sep. 14, 2017

(30) Foreign Application Priority Data

Mar. 9, 2016  (IN) .............................. 201611008280

(51) Int. Cl.
| | |
|---|---|
| *H04N 7/16* | (2011.01) |
| *H04H 20/14* | (2008.01) |
| *H04H 60/29* | (2008.01) |
| *H04N 21/44* | (2011.01) |
| *H04N 21/81* | (2011.01) |
| *H04N 21/234* | (2011.01) |
| *H04N 21/235* | (2011.01) |
| *H04N 21/2187* | (2011.01) |

(52) U.S. Cl.
CPC ... *H04N 21/44008* (2013.01); *H04N 21/2187* (2013.01); *H04N 21/235* (2013.01); *H04N 21/23418* (2013.01); *H04N 21/812* (2013.01)

(58) Field of Classification Search
CPC ........... H04N 21/44008; H04N 21/812; H04N 21/23418; H04N 21/235; H04N 21/2187
See application file for complete search history.

(56) References Cited

U.S. PATENT DOCUMENTS

| | | | |
|---|---|---|---|
| 6,469,749 B1 | 10/2002 | Dimitrova et al. | |
| 7,809,154 B2 | 10/2010 | Lienhart et al. | |
| 8,553,148 B2* | 10/2013 | Ramaswamy | H04H 60/31 348/180 |
| 9,137,568 B2 | 9/2015 | Sinha et al. | |
| 2005/0149968 A1* | 7/2005 | Konig | G06F 17/30802 725/32 |
| 2009/0060396 A1* | 3/2009 | Blessan | G06K 9/6212 382/317 |

(Continued)

*Primary Examiner* — Oschta Montoya
(74) *Attorney, Agent, or Firm* — Kolisch Hartwell, P.C.

(57) ABSTRACT

A system and method for detecting one or more advertisements broadcasted on a channel in real time includes a step of receiving a live feed, with the live feed being associated with a media content broadcast on the channel in real time. The method also includes a step of deriving one or more characteristics associated with one or more properties associated with the channel. The method also includes a step of analyzing the one or more characteristics associated with the one or more properties. There is also a step of matching the derived one or more characteristics associated with the one or more properties with the stored one or more characteristics associated with the one or more properties. The method also includes a step of detecting the one or more advertisements broadcasted on the channel in real time.

18 Claims, 6 Drawing Sheets

(56) References Cited

U.S. PATENT DOCUMENTS

| | | | |
|---|---|---|---|
| 2011/0313856 A1* | 12/2011 | Cohen | G06F 17/30026 705/14.49 |
| 2012/0167133 A1* | 6/2012 | Carroll | G06Q 30/0251 725/32 |
| 2012/0185905 A1* | 7/2012 | Kelley | H04N 9/75 725/109 |

* cited by examiner

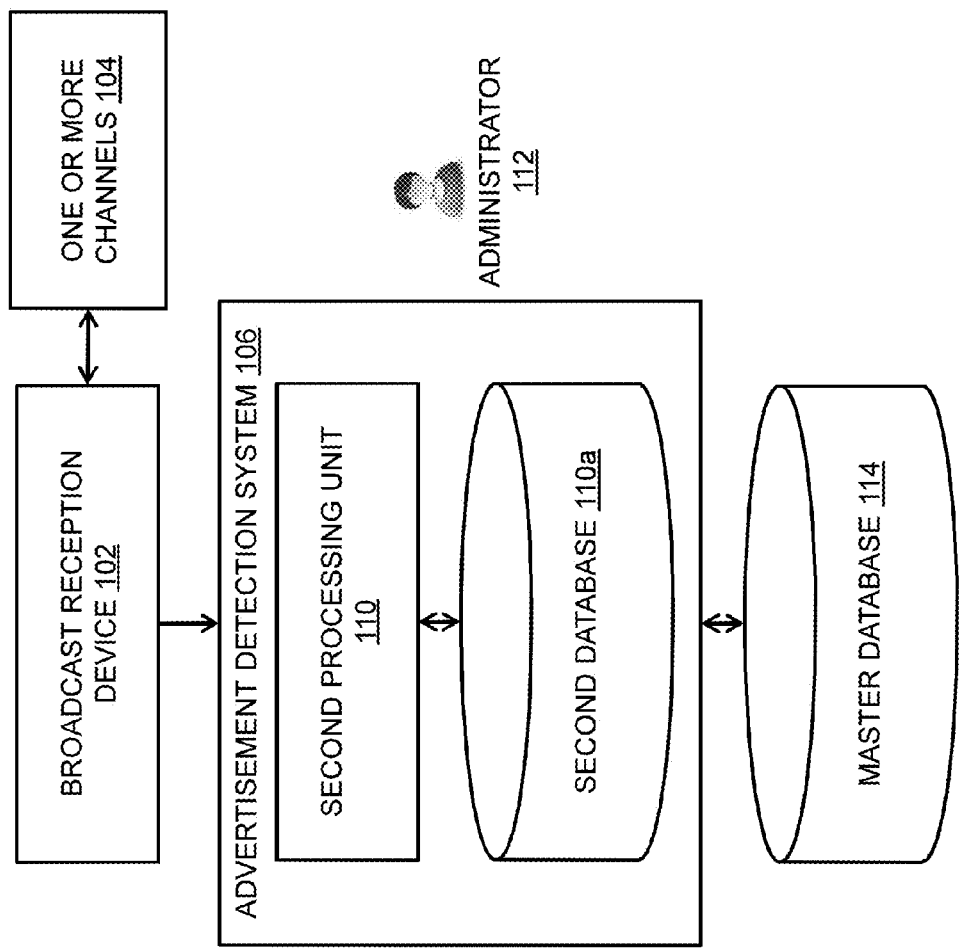

METHOD AND SYSTEM FOR DETECTION OF TELEVISION ADVERTISEMENTS USING BROADCASTING CHANNEL CHARACTERISTICS

INTRODUCTION

The present invention relates to the field of digital fingerprinting of media content and, in particular, relates to detection of advertisements using one or more characteristics associated with a channel.

Over the last few years, the television industry has witnessed unprecedented boom in number of channels. As their number has increased, this has led to more competition between these channels. Each channel adopts a logo as it uniquely identifies its appeal to its viewers. In between all this competition and marketing, advertisers have utilized television channels as an important source of brand promotion. With time, these advertisers need advertisement airing data of its competitors to stay ahead in brand promotion. They also need to study their advertisement placement trend. The sponsored advertisements are inserted in scheduled programs and are rated based on a nature of the content. Each of the scheduled programs and the sponsored advertisements are given a rating certificate. The rating certificate includes a parental guidance (PG) rating, a restricted (R) rating, a universal (U) rating, a universal adult (U/A) rating, a strong parental guidance (SPG) rating and the like. Usually, a machine studying each frame of the broadcast cannot differentiate the advertisement from the sponsored program. However, the channel logo behavior and advertisement ratings can be effectively used to detect advertisements. Thus, there is a need to detect advertisements using the channel logo and content ratings.

Traditionally, these advertisements can be primarily detected through a supervised machine learning based approach and an unsupervised machine learning based approach. The unsupervised machine learning based approach works through analysis of digital fingerprints of the broadcasted content.

Several systems and methods are currently available which perform detection of the advertisements using the properties of the channel. In U.S. Pat. No. 7,809,154 B2, a method and system for recognition of known video segments by using statistical parameters of compressed digital video streams by comparison against fingerprints is provided. The system checks for commercial break intros and commercial break outros for detecting the advertisements. The detection is done by detecting existence of specific audio or video or specific logos in the video stream when the commercial break intros and the outros are the same.

In another U.S. Pat. No. 9,137,568 B2, a method and system for identification of logo based on automatic content recognition is provided. The identification of the logo is done by fingerprinting certain regions of the video frame for identifying the source of the content being displayed. In addition, the system determines one or more locations where a graphical item representing a television network appears. Accordingly, the system takes fingerprints of these one or more locations and generates a profile for these locations. The profile is sent to a connected TV to take additional fingerprints to enale identification of the logo.

In yet another U.S. Pat. No. 6,469,749 B1, a method and system for identifying segments in a video signal associated with a commercial is provided. The system extracts signatures of the identified segments. Accordingly, the extracted signatures are utilized along with temporal and contextual information to determine which of the identified segments are associated with a particular video content. In addition, the system identifies or checks for absence of a superimposed video logo along with other information for identifying the segments associated with the commercial.

The present systems and methods have several disadvantages. Most of the methods and system rely on supervised detection of repeated advertisements. These methods and system are either not able to detect advertisements or imperfectly determine any new advertisements. In addition, these methods and systems do not take into account a change in characteristics of the logo for each channel during airing of the advertisements. Moreover, these methods and systems do not take into account the rating for the media content for detecting advertisements. Further, the existing methods and systems for detecting advertisements using logo are complex. Furthermore, the fingerprint of the area where the graphical item such as logo is visible is not easy.

In light of the above stated discussion, there is a need for a method and system which overcomes the above stated disadvantages.

SUMMARY

In an aspect, the present disclosure provides a method for detecting one or more advertisements broadcasted on a channel in real time. The method includes a step of receiving a live feed. The live feed associated with a media content broadcasted on the channel in the real time. The method includes another step of derivation of one or more characteristics associated with one or more properties associated with the channel in the real time. The method includes yet another step of analysis of the one or more characteristics associated with the one or more properties associated with the channel in the real time. The method includes yet another step of matching of the derived one or more characteristics associated with the one or more properties with the stored one or more characteristics associated with the one or more properties. The method includes yet another step of detection of the one or more advertisements broadcasted on the channel in the real time. The one or more characteristics includes a first set of characteristics associated with a logo of the channel and a second set of characteristics associated with a content rating certification associated with the media content broadcasted on the channel. The one or more characteristics are derived by performing a scale invariant feature transform for each of one or more prominent frames. The analysis is done for noticing a change in the one or more characteristics associated with the one or more properties of the channel in the first one or more pre-defined regions and the second one or more pre-defined regions. Each prominent frame of the one or more prominent frames is analyzed sequentially for noticing the change in the one or more characteristics. The matching is done between each prominent video frame with a subsequent prominent video frame. The matching is done at the first one or more pre-defined regions and the second one or more pre-defined regions on each of the one or more prominent frames. The detection is based on a result of the matching. The detection of the one or more advertisements is positive when the change in the one or more characteristics of the one or more properties is noticed. The detection is positive based on occurrence of event in the first one or more pre-defined regions and the second one or more pre-defined regions.

In an embodiment of the present disclosure, the method includes yet another step of extraction of a first set of audio fingerprints and a first set of video fingerprints corresponding to the media content broadcasted on the channel. The first set of audio fingerprints and the first set of video fingerprints are extracted sequentially in the real time. The extraction of the first set of video fingerprints is done by sequentially extracting one or more prominent fingerprints corresponding to one or more prominent frames of a pre-defined number of frames. The pre-defined number of frames is present in the media content for a pre-defined interval of broadcast.

In an embodiment of the present disclosure, the method includes yet another step of generation of a set of digital signature values corresponding to the extracted first set of video fingerprints. The generation of each digital signature value of the set of digital signature values is done by dividing each prominent frame of the one or more prominent frames into a pre-defined number of blocks. Further, each block of each prominent frame of the one or more prominent frames is gray scaled. Furthermore, the generation of each digital signature value of the set of digital signature values is done by calculating a first bit value and a second bit value for each block of the prominent frame. In addition, the generation of each digital signature value of the set of digital signature values is done by obtaining a 32 bit digital signature value corresponding to each prominent frame. Each block of the pre-defined number of block has a pre-defined number of pixels. The first bit value and the second bit value is calculated from comparison of a mean and a variance for the pre-defined number of pixels in each block of the prominent frame with a corresponding mean and variance for a master frame. The corresponding mean and variance for the master frame is present in the master database. The 32 bit digital signature value is obtained by sequentially arranging the first bit value and the second bit value for each block of the pre-defined number of blocks of the prominent frame.

In an embodiment of the present disclosure, the first bit value and the second bit value are assigned a binary 0 when the mean and the variance for each block of the prominent frame is less the corresponding mean and variance of each master frame. The first bit value and the second bit value are assigned a binary 1 when the mean and the variance for each block of the prominent frame are greater than the corresponding mean and variance of each master frame.

In an embodiment of the present disclosure, the one or more properties associated with the channel include a logo associated with the channel and a content rating certification associated with the media content broadcasted on the channel.

In an embodiment of the present disclosure, the first set of characteristics includes one or more features associated with the logo. The one or more features include a position of the logo, a shape of the logo, one or more colors associated with the logo, a size of the logo and a brightness level associated with the logo. In addition, the one or more features include one or more characters in the logo and one or more curves associated with the logo. The second set of characteristics associated with the content rating certification include a type of rating certificate allotted to the media content and a position associated with a display of the rating certificate. The type of rating certificate includes at least one of an adult rating, universal adult rating, parental guidance rating and a strong parental guidance rating.

In an embodiment of the present disclosure, the method includes yet another step of determination of a first one or more pre-defined regions associated with a display of the logo associated with the channel. In addition, the computer-implemented method further includes determination of a second one or more pre-defined regions associated with a display of the content rating certification associated with the media content broadcasted on the channel.

In an embodiment of the present disclosure, the method includes yet another step of storage of the derived one or more characteristics associated with the one or more properties associated with the channel. In addition, the computer-implemented method further includes storage of the first set of audio fingerprints, the first set of video fingerprints and the set of digital signature values corresponding to the extracted first set of video fingerprints. The storage is done in a first database and a second database.

In an embodiment of the present disclosure, the event in the first one or more pre-defined regions is at least one of fading of the one or more colors associated with the logo, change in position of the logo and change in size of the logo. In addition, the event is at least one of a change in the shape of the logo, disappearance of the logo, decrease in the brightness level of the logo, increase in the brightness level of the logo and change in the one or more curves in the logo. The event in the second one or more pre-defined regions is at least one of appearance of the rating certificate, change in position of the rating certificate and a change in the type of the rating certificate.

In an embodiment of the present disclosure, the detection of the one or more advertisements is done based on at least one of the logo associated with the channel and the content rating certification of the media content broadcasted on the channel. The detection is done based on the content rating certification when the logo associated with the channel is small and transparent.

In another embodiment of the present disclosure, the detection of the one or more advertisements is done based on the logo associated with the channel and the content rating certification of the media content broadcasted on the channel simultaneously.

In an embodiment of the present disclosure, the method includes yet another step of updation of the derived one or more characteristics of the one or more properties associated with the channel and the first set of video fingerprints. In addition, the method includes yet another step of updation of the set of digital signature values for the detected one or more advertisements in the master database.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for detecting one or more advertisements broadcasted on a channel in real time. The method includes a step of receiving a live feed. The live feed associated with a media content broadcasted on the channel in the real time. The method includes another step of derivation of one or more characteristics associated with one or more properties associated with the channel in the real time. The method includes yet another step of analysis of the one or more characteristics associated with the one or more properties associated with the channel in the real time. The method includes yet another step of matching of the derived one or more characteristics associated with the one or more properties with the stored one or more characteristics associated with the one or more properties. The method includes yet another step of detection of the one or more advertisements broadcasted on the channel in the real time. The one or more characteristics includes a first set of characteristics associated with a logo of the channel and a second set of characteristics associated with a content rating certification associated with the media content broadcasted on the channel. The one or more characteristics are derived by performing a scale invariant feature transform for each of one or more prominent frames. The analysis is done for noticing a change in the one or more characteristics associated with the one or more properties of the channel in the first one or more pre-defined regions and the second one or more pre-defined regions. Each prominent frame of the one or more prominent frames is analyzed sequentially for noticing the change in the one or more characteristics. The matching is done between each prominent video frame with a subsequent prominent video frame. The matching is done at the first one or more pre-defined regions and the second one or more pre-defined regions on each of the one or more prominent frames. The detection is based on a result of the matching. The detection of the one or more advertisements is positive when the change in the one or more characteristics of the one or more properties is noticed. The detection is positive based on occurrence of event in the first one or more pre-defined regions and the second one or more pre-defined regions.

In yet another aspect, the present disclosure provides a computer-readable storage medium. The computer readable storage medium enables encoding of computer executable instructions. The computer executable instructions when executed by at least one processor perform a method. The at least one processor performs the method for detecting one or more advertisements broadcasted on a channel in real time. The method includes a step of receiving a live feed. The live feed associated with a media content broadcasted on the channel in the real time. The method includes another step of derivation of one or more characteristics associated with one or more properties associated with the channel in the real time. The method includes yet another step of analysis of the one or more characteristics associated with the one or more properties associated with the channel in the real time. The method includes yet another step of matching of the derived one or more characteristics associated with the one or more properties with the stored one or more characteristics associated with the one or more properties. The method includes yet another step of detection of the one or more advertisements broadcasted on the channel in the real time. The one or more characteristics includes a first set of characteristics associated with a logo of the channel and a second set of characteristics associated with a content rating certification associated with the media content broadcasted on the channel. The one or more characteristics are derived by performing a scale invariant feature transform for each of one or more prominent frames. The analysis is done for noticing a change in the one or more characteristics associated with the one or more properties of the channel in the first one or more pre-defined regions and the second one or more pre-defined regions. Each prominent frame of the one or more prominent frames is analyzed sequentially for noticing the change in the one or more characteristics. The matching is done between each prominent video frame with a subsequent prominent video frame. The matching is done at the first one or more pre-defined regions and the second one or more pre-defined regions on each of the one or more prominent frames. The detection is based on a result of the matching. The detection of the one or more advertisements is positive when the change in the one or more characteristics of the one or more properties is noticed. The detection is positive based on occurrence of event in the first one or more pre-defined regions and the second one or more pre-defined regions.

BRIEF DESCRIPTION OF THE DRAWINGS

Figure 1A:
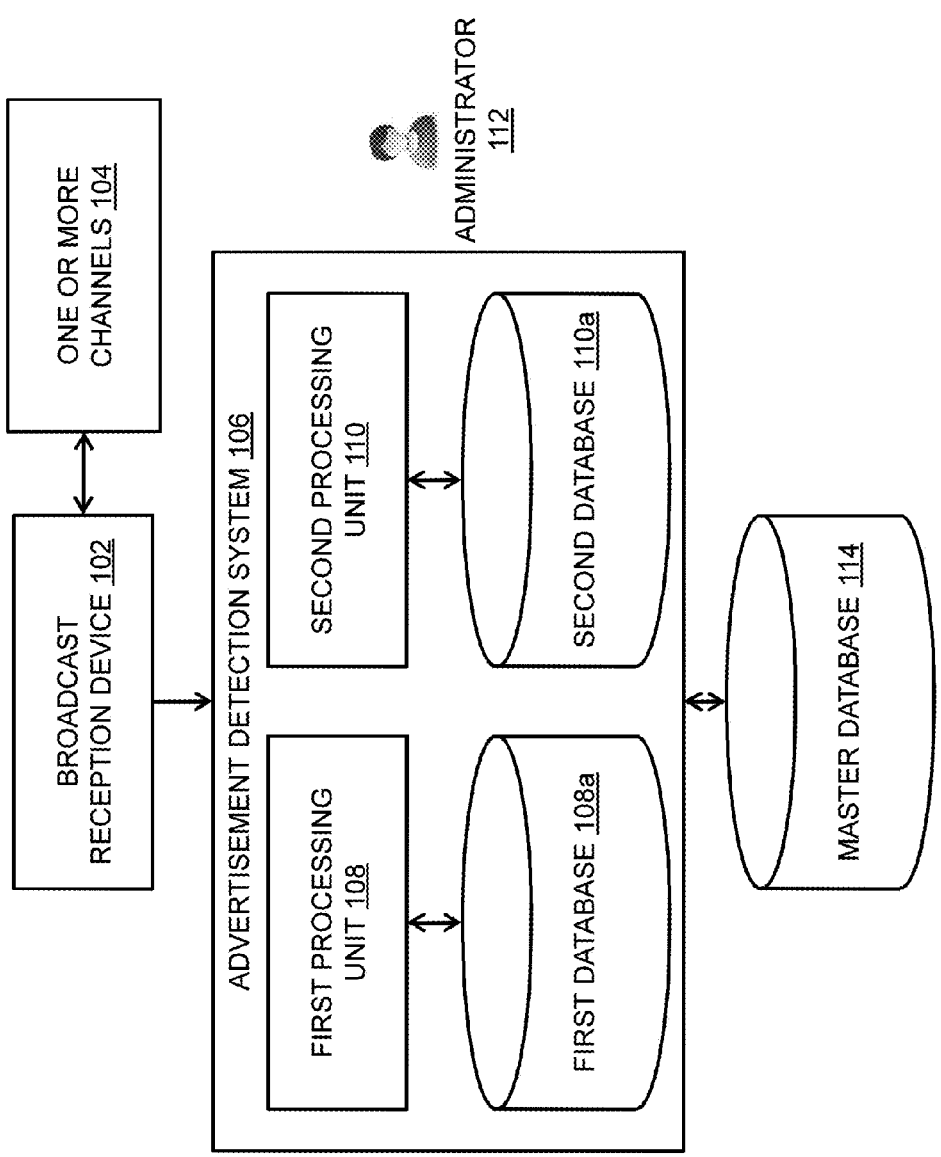
Figure 1B:
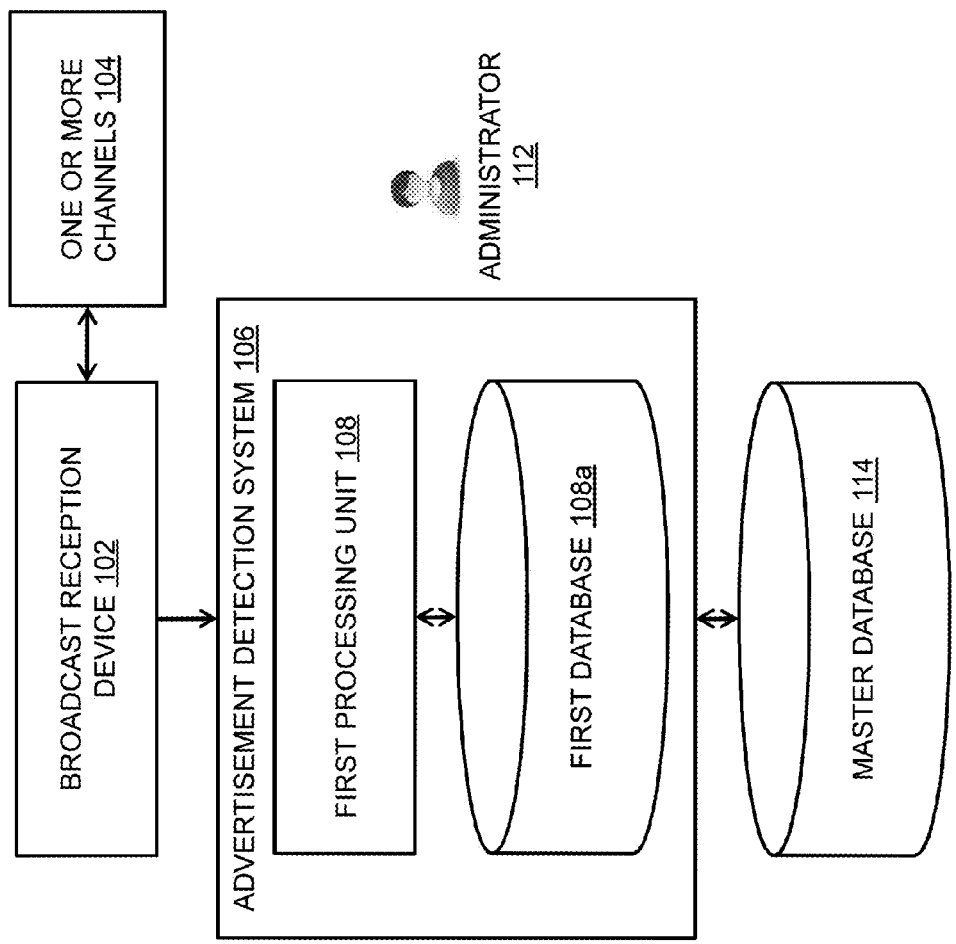
Figure 2:
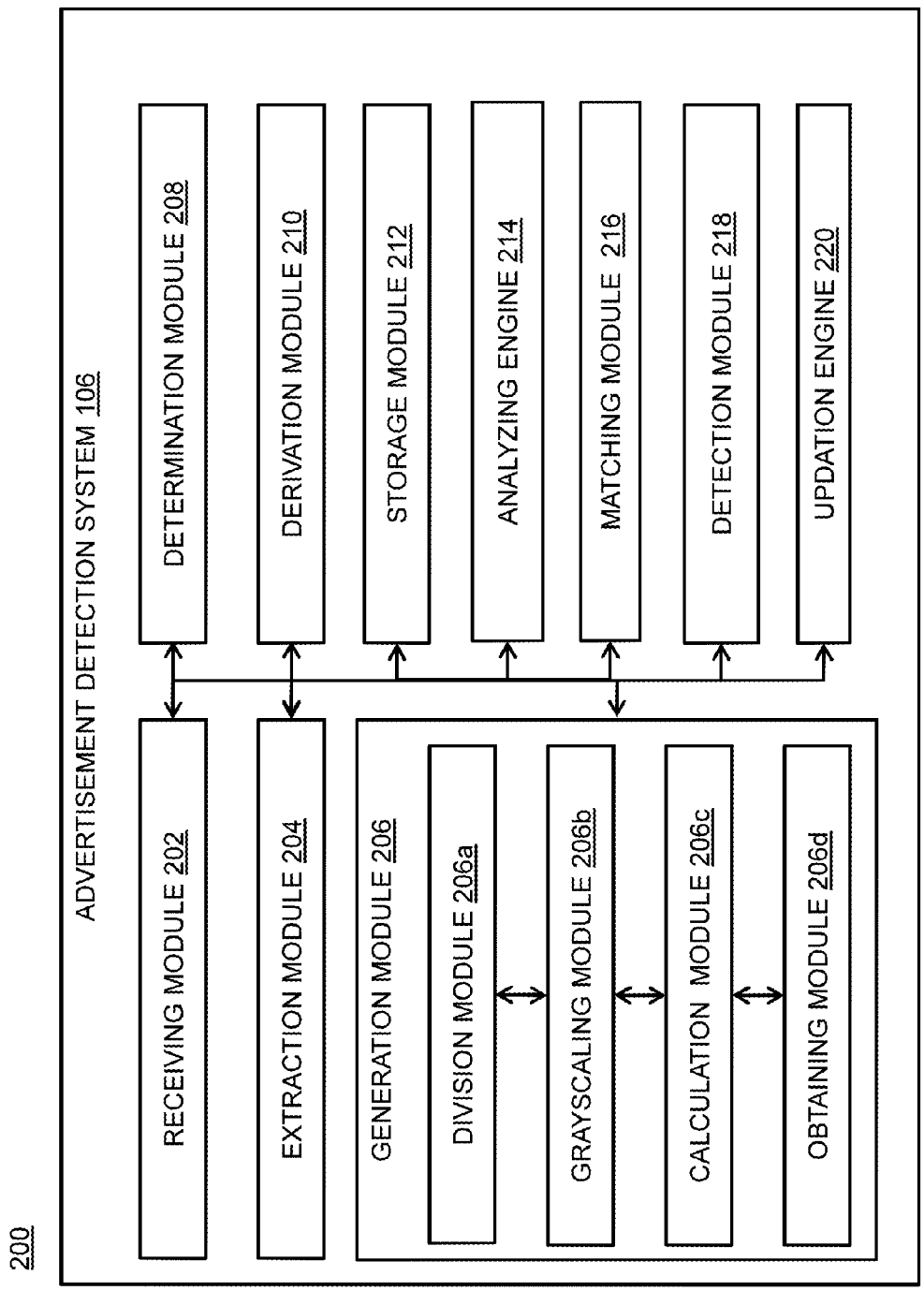
Figure 3:
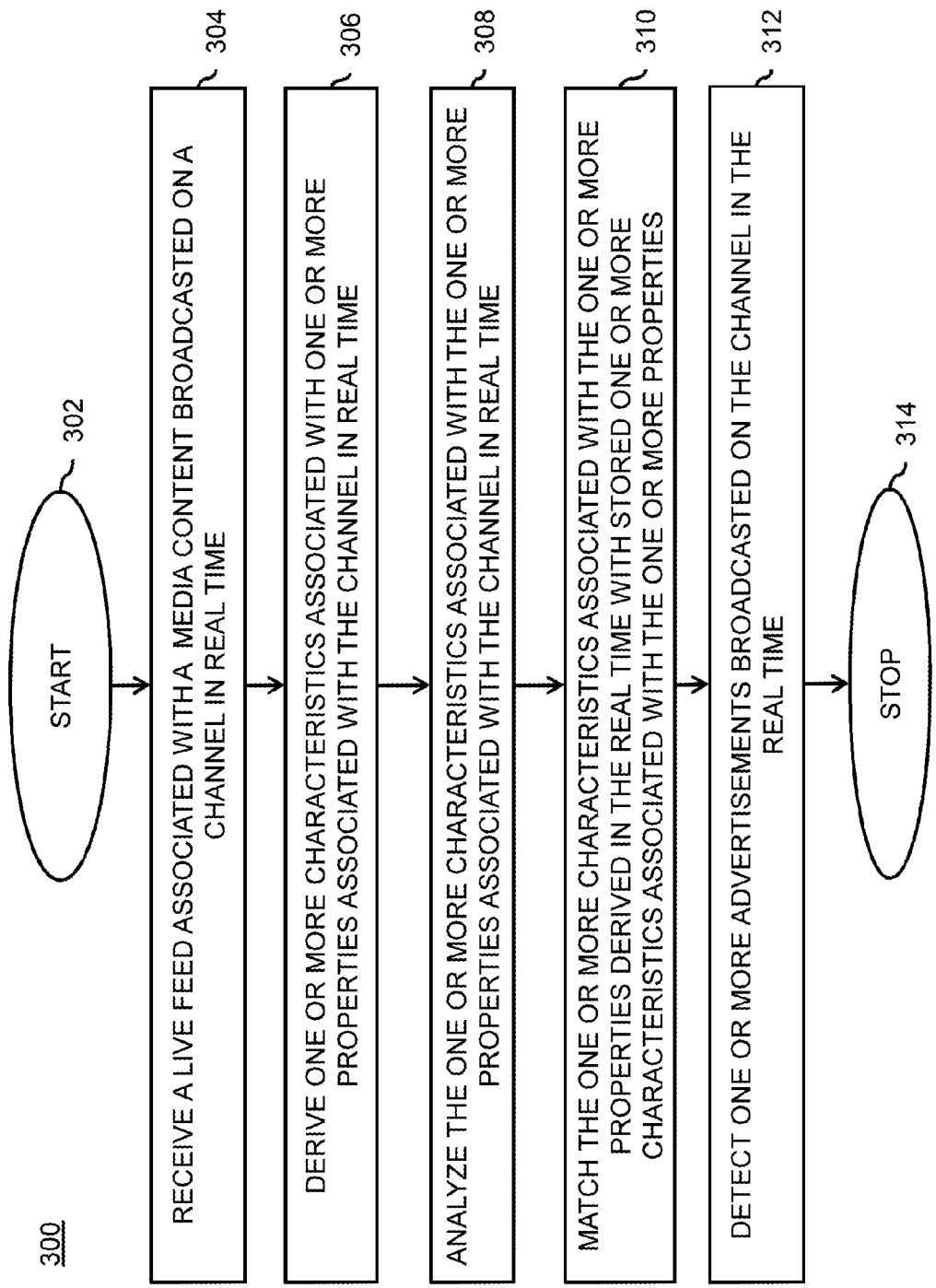
Figure 4:
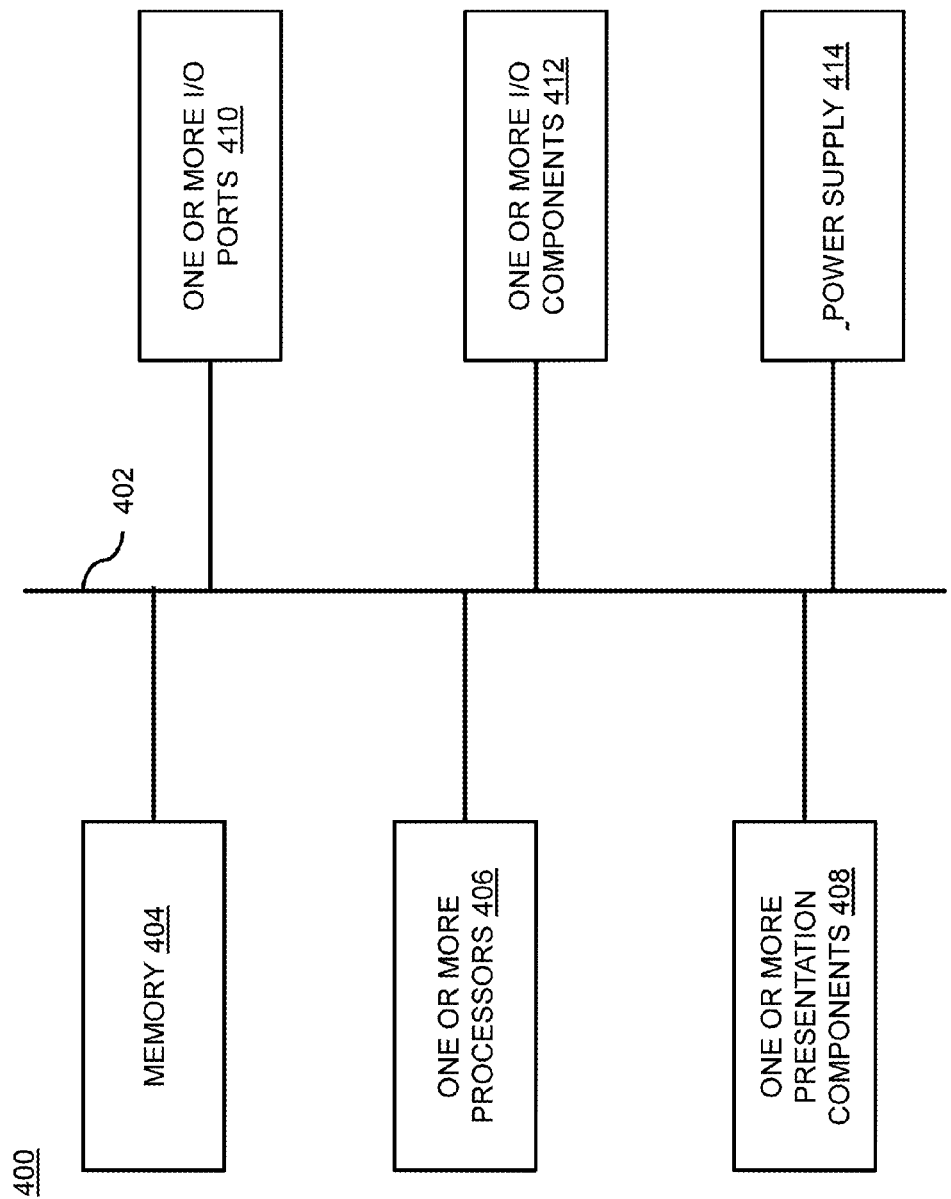

Having thus described the invention in general terms, reference will now be made to the accompanying drawings, which are not necessarily drawn to scale, and wherein:

FIG. 1A illustrates a system for detection of one or more advertisements broadcasted on a channel, in accordance with various embodiments of the present disclosure;

FIG. 1B illustrates a system for the unsupervised detection of the one or more advertisements broadcasted on the channel, in accordance with an embodiment of the present disclosure;

FIG. 1C illustrates a system for the supervised detection of the one or more advertisements broadcasted on the channel, in accordance with another embodiment of the present disclosure;

FIG. 2 illustrates a block diagram of an advertisement detection system, in accordance with various embodiments of the present disclosure;

FIG. 3 illustrates a flow chart for the detection of the one or more advertisements broadcasted on the channel, in accordance with various embodiments of the present disclosure; and FIG. 4 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates a system 100 for detection of one or more advertisements broadcasted on a channel, in accordance with various embodiments of the present disclosure. The system 100 performs a supervised and an unsupervised detection of the one or more advertisements broadcasted on the channel in real time. In addition, the system 100 performs the detection of the one or more advertisements on the channel based on one or more characteristics of one or more properties associated with the channel (described below in the patent application). The system 100 describes an environment suitable for an interactive reception and processing of a channel broadcast. The system 100 is configured to provide a setup for the detection of the one or more advertisements.

The system 100 includes a broadcast reception device 102, an advertisement detection system 106 and a master database 114. The above stated elements of the system 100 operate coherently and synchronously to detect the one or more advertisements present in media content broadcasted in the channel. The above stated elements of the system 100 operate coherently and synchronously to detect the one or more advertisements based on the one or more properties of the channel. The broadcast reception device 102 is a channel feed receiving and processing device. The broadcast reception device 102 is attached directly or indirectly to a receiving antenna or dish. The receiving antenna receives a broadcasted signal carrying one or more channel feeds. In an embodiment of the present disclosure, the receiving antenna receives the broadcast signal carrying a live feed associated with each of one or more channels. The one or more channel feeds are encoded in a pre-defined format. In addition, the one or more channel feeds have a set of characteristics. The set of characteristics includes a frame rate, an audio sample rate, one or more frequencies and the like.

The broadcasted signal carrying the one or more channel feeds is initially transmitted from a transmission device. In an embodiment of the present disclosure, the broadcasted signal carrying the one or more channel feeds is a multiplexed MPEG-2 encoded signal having a constant bit rate. In another embodiment of the present disclosure, the broadcasted signal carrying the one or more channel feeds is a multiplexed MPEG-2 encoded signal having a variable bit rate. In yet another embodiment of the present disclosure, the broadcasted signal carrying the one or more channel feeds is any digital standard encoded signal. The bit rate is based on complexity of each frame in each of the one or more channel feeds. The quality of the multiplexed MPEG-2 encoded signal will be reduced when the broadcasted signal is too complex to be coded at a constant bit-rate. The bit rate of the variable bit-rate MPEG-2 streams is adjusted dynamically as less bandwidth is needed to encode the images with a given picture quality. In addition, the broadcasted signal is encrypted for a conditional access to a particular subscriber. The encrypted broadcast signal is uniquely decoded by the broadcast reception device 102.

In an example, a digital TV signal is received on the broadcast reception device 102 as a stream of MPEG-2 data. The MPEG-2 data has a transport stream. The transport stream has a data rate of 40 megabits/second for a cable or satellite network. Each transport stream consists of a set of sub-streams. The set of sub-streams is defined as elementary streams. Each elementary stream includes an MPEG-2 encoded audio, an MPEG-2 encoded video and data encapsulated in an MPEG-2 stream. In addition, each elementary stream includes a packet identifier (hereinafter "PID") that acts as a unique identifier for corresponding elementary stream within the transport stream. The elementary streams are split into packets in order to obtain a packetized elementary stream (hereinafter "PES").

In an embodiment of the present disclosure, the broadcast reception device 102 is a digital set top box. In another embodiment of the present disclosure, the broadcast reception device 102 is a hybrid set top box. In yet another embodiment of the present disclosure, the broadcast reception device 102 is any standard broadcast signal processing device. Further, the broadcast reception device 102 may receive the broadcast signal from any broadcast signal medium. In an embodiment of the present disclosure, the broadcast signal medium is an ethernet cable. In another embodiment of the present disclosure, the broadcast signal medium is a satellite dish. In yet another embodiment of the present disclosure, the broadcast signal medium is a coaxial cable. In yet another embodiment of the present disclosure, the broadcast signal medium is a telephone line having DSL connection. In yet another embodiment of the present disclosure, the broadcast signal medium is a broadband over power line (hereinafter "BPL"). In yet another embodiment of the present disclosure, the broadcast signal medium is an ordinary VHF or UHF antenna.

The broadcast reception device 102 primarily includes a signal input port, an audio output port, a video output port, a de-multiplexer, a video decoder, an audio decoder and a graphics engine. The broadcast signal carrying the one or more channel feeds is received at the signal input port. The broadcast signal carrying the one or more channel feeds is de-multiplexed by the de-multiplexer. The video decoder decodes the encoded video and the audio decoder decodes the encoded audio. The video and audio corresponds to a channel selected in the broadcast reception device 102. In general, the broadcast reception device 102 carries the one or more channel feeds multiplexed to form a single transporting stream. The broadcast reception device 102 can decode only one channel in real time.

Further, the decoded audio and the decoded video are received at the audio output port and the video output port. Further, the decoded video has a first set of features. The first set of features includes a frame height, a frame width, a frame rate, a video resolution, a bit rate and the like. Moreover, the decoded audio has a second set of features. The second set of features includes a sample rate, a bit rate, a bin size, one or more data points, one or more prominent frequencies and one or more prominent amplitudes. Further, the decoded video may be of any standard quality. In an embodiment of the present disclosure, the decoded video signal is a 144p signal. In another embodiment of the present disclosure, the decoded video signal is a 240p signal. In yet another embodiment of the present disclosure, the decoded video signal is a 360p signal. In yet another embodiment of the present disclosure, the decoded video signal is a 480p signal. In yet another embodiment of the present disclosure, the decoded video signal is a 720p video signal. In yet another embodiment of the present disclosure, the decoded video signal is a 1080p video signal. In yet another embodiment of the present disclosure, the decoded video signal is a 1080i video signal. Here, p and i denotes progressive scan and interlace scan techniques.

Further, the decoded video and the decoded audio (hereinafter "media content") are transferred to the advertisement detection system 106 through a transfer medium. The transfer medium can be a wireless medium or a wired medium. Moreover, the media content includes one or more television programs, the one or more advertisements, one or more channel related data, subscription related data, operator messages and the like. The media content has a pre-defined frame rate, a pre-defined number of frames and a pre-defined bit rate for a pre-defined interval of broadcast.

Further, the broadcast reception device 102 broadcasts one or more channels 104 on a user end device. The user end device is connected to the broadcast reception device 102. In addition, the connection is done through one or more cables. The one or more cables connect corresponding one or more ports on the user end device with corresponding one or more ports on the broadcast reception device 102. The end user device is any device capable of allowing one or more users to access the one or more channels for watching media content in real time. In an embodiment of the present disclosure, the end user device includes a CRT television, a LED television, a LCD television, a plasma television and the like. In another embodiment of the present disclosure, the end user device is an internet connected television.

Furthermore, each of the one or more channels may be any type of channel of various types of channels. The various types of channels include sports channels, movie channels, news channels, regional channels, music channels and various other types of channels. The broadcast reception device 102 is associated with a media content broadcast enabler. The media content broadcast enabler provides the broadcast reception device 102 to the one or more users. In an embodiment of the present disclosure, the media content broadcast enabler provides the broadcast reception device 102 for allowing the one or more users to access and view the media content on the corresponding user end device. In an embodiment of the present disclosure, the media content broadcast enabler is associated with a company or an organization employed in construction and distribution of a plurality of broadcast reception devices.

In an embodiment of the present disclosure, the media content broadcast enabler acts as a third party interface for distributing the broadcast reception device 102 to the corresponding one or more users. Moreover, the media content broadcast enabler include but may not be limited to DTH (Direct to Home) provider, STB (set top box) provider, cable TV provider and the like. In an embodiment of the present disclosure, the media content broadcast enabler is located in a vicinity of the one or more users. In an embodiment of the present disclosure, the media content broadcast enabler is enabled to provide one or more media broadcasting services to the one or more users. In an embodiment of the present disclosure, the media content broadcast enabler is allotted a pre-defined range or area for providing the one or more media broadcasting services to the one or more users located or living in the pre-defined range or area.

Moreover, the media content broadcast enabler provides the one or more media content broadcasting services based on a subscription plan bought by the one or more users. The subscription plan corresponds to a plan from a pre-defined set of plans set by the media content broadcasting enabler and chosen by the one or more users. In an embodiment of the present disclosure, the subscription plan includes a pre-defined list of channels and a pre-determined amount of money for availing the subscription plan.

In an embodiment of the present disclosure, the one or more users pay the pre-determined amount of money at a regular basis to the media content broadcasting enabler for availing the subscription plan. In an embodiment of the present disclosure, the one or more users avail the one or more media broadcasting services of a same media service provider (the media content broadcasting enabler). In an embodiment of the present disclosure, the media content broadcasting enabler stores information of the one or more users in a server. In an embodiment of the present disclosure, the media content broadcast enabler maintains the server.

Further, each of the one or more channels 104 is associated with one or more properties. The one or more properties associated with the channel of the one or more channels includes a logo associated with the channel and a content rating certification associated with the media content broadcasted on the channel. Also, each of the one or more properties includes one or more characteristics. Each channel of the one or more channels 104 has the logo. In general, the logo of a channel represents an identity of the channel. In addition, the logo represents a unique name of the channel. The unique name is written in a graphical format. In an embodiment of the present disclosure, the logo is a unique identification for the channel. In addition, each of the one or more channels 104 has a unique logo. In general, the logo occupies a portion of a screen of the channel. Further, the owners of each of the one or more channels 104 display the logo for easier identification of the one or more channels 104.

The logo of each of the one or more channels 104 is designed by a corresponding logo designer of one or more logo designers. In addition, each of the one or more logo designers utilize a logo designing software for designing the logo for the corresponding one or more channels 104. Further, the logo of each of the one or more channels 104 appears at a first pre-defined region of first one or more pre-defined regions. Further, the media content is broadcasted according to a pre-defined number of video frames in a second methodology. In an embodiment of the present disclosure, the logo of each of the one or more channels 104 appears on each video frame of the media content broadcasted on the one or more channels 104. In another embodiment of the present disclosure, the logo appears on some video frames during the broadcasting of the media content on the one or more channels 104.

Further, the first pre-defined region of the first one or more pre-defined regions corresponds to an area where the logo of each of the one or more channels 104 is displayed. In an embodiment of the present disclosure, the first pre-defined region is set by the owners associated with each of the one or more channels 104. In an embodiment of the present disclosure, the first pre-defined region is different for each of the one or more channels 104. In another embodiment of the present disclosure, the first pre-defined region is same for a first set of channels of the one or more channels 104. In yet another embodiment of the present disclosure, the first pre-defined region is same for a second set of channels of the one or more channels 104.

The first one or more pre-defined regions include top right corner, top left corner, bottom left corner, bottom right corner and the like. Further, the one or more characteristics include a first set of characteristics associated with the logo of the channel. The first set of characteristics includes one or more features associated with the logo. The one or more features include a position of the logo, a shape of the logo, one or more colors associated with the logo, a size of the logo and a brightness level associated with the logo. In addition, the one or more features include one or more characters in the logo and one or more curves associated with the logo. In an embodiment of the present disclosure, the one or more features are defined during making of the logo by the corresponding logo designer.

In an embodiment of the present disclosure, the one or more features of the logo change on occurrence of any event.

In an embodiment of the present disclosure, the event includes a scheduled program going for a commercial break, the schedule program returning from the commercial break or any other type of event. In an embodiment of the present disclosure, the position of the logo changes from the first pre-defined region changes to any other region of the first one or more pre-defined regions during the event. In another embodiment of the present disclosure, the shape of the logo may change from a first pre-defined shape to a second pre-defined shape after the occurrence of the event.

In yet another embodiment of the present disclosure, the size of the logo may change from a first pre-defined size to a second pre-defined size after the occurrence of the event. In yet another embodiment of the present disclosure, the brightness level of the logo may decrease from a first pre-defined level to a second pre-defined level after the occurrence of the event. In yet another embodiment of the present disclosure, the brightness level of the logo may increase from the first pre-defined level to a second pre-defined level after the occurrence of the event. In yet another embodiment of the present disclosure, the one or more colors of the logo may change after the occurrence of the event.

In yet another embodiment of the present disclosure, the logo may disappear after the occurrence of the event. In an embodiment of the present disclosure, each of the one or more features changes simultaneously on the occurrence of the event. In another embodiment of the present disclosure, a set of features of the one or more features changes after the occurrence of the event. In an embodiment of the present disclosure, the one or more features may not change after the occurrence of the event.

For example, a TV show X is currently playing on a channel Y and a logo L of the channel Y appears on a top right corner of the screen when the TV show X is playing. The logo L has a blue color, a fixed size, a fixed shape and a fixed brightness level. The TV show goes for a commercial break after some time and the logo L shifts from the top right corner to a left top corner. In another case, the blue color of the logo L changes to yellow after the occurrence of the commercial break. In yet another case, the size and the brightness level of the logo L decreases after the occurrence of the commercial break. In yet another case, the shape and the size of the logo L changes on the occurrence of the commercial break.

Going further, each of the one or more channels 104 is associated with the content rating certification. In an embodiment of the present disclosure, the media content played on each of the one or more channels is associated with the content rating certification. The media content includes one or more scheduled programs along with the one or more advertisements. The one or more advertisements are broadcasted in between the one or more scheduled programs. Further, each of the one or more scheduled programs and the one or more advertisements is associated with the content rating certification.

The content rating certification corresponds to a rating certificate allotted to each of the one or more scheduled programs and the one or more advertisements. The content rating certification is provided based on a nature of content shown in the one or more scheduled programs and the one or more advertisements. The nature of content is decided based on an age group associated with viewers watching the content. The content rating certification denotes a recommended age group of the viewers for watching the particular content. In general, the content rating certification is provided by a censor board.

Further, the one or more characteristics include a second set of characteristics associated with the content rating certification associated with the media content broadcasted on the channel of the one or more channels 104. The second set of characteristics associated with the content rating certification include a type of rating certificate allotted to the media content and a position associated with a display of the rating certificate. The type of rating certificate includes at least one of an adult rating (A), universal adult rating (U/A), parental guidance (PG) rating, a restricted (R) rating and a strong parental guidance rating (SPG).

Furthermore, the content rating certification of the media content broadcasted on each of the one or more channels 104 appears at a second pre-defined region of second one or more pre-defined regions on the channel. In an embodiment of the present disclosure, the content rating certification of the media content appears on each video frame of the media content broadcasted on the one or more channels 104. In another embodiment of the present disclosure, the content rating certification of the media content appears on some video frames during the broadcasting of the media content on the one or more channels 104.

Further, the second pre-defined region of the second one or more pre-defined regions corresponds to an area where the content rating certification of the media content is displayed. In an embodiment of the present disclosure, the second pre-defined region is set by the owners associated with each of the one or more channels 104. In an embodiment of the present disclosure, the second pre-defined region is different for each of the one or more channels 104. In another embodiment of the present disclosure, the second pre-defined region is same for the first set of channels of the one or more channels 104. In yet another embodiment of the present disclosure, the second pre-defined region is same for the second set of channels of the one or more channels 104.

The second one or more pre-defined regions include top right corner, top left corner, bottom left corner, bottom right corner or any other area suitable for showing the content rating certification of the media content. In an embodiment of the present disclosure, the content rating certification is visible during the broadcasting of the one or more scheduled programs and the one or more advertisements. In another embodiment of the present disclosure, the content rating certification is not visible for the one or more scheduled programs. In yet another embodiment of the present disclosure, the content rating certification is visible for the one or more advertisements only. Also, the content rating certification is displayed in the second pre-defined region of the second one or more pre-defined regions.

In an embodiment of the present disclosure, the second set of characteristics of the content rating certification change on occurrence of any event. In an embodiment of the present disclosure, the event includes the scheduled program going for the commercial break, the scheduled program returning from the commercial break or any other type of event. In an embodiment of the present disclosure, the type of rating certificate changes from a first type to a second type during the event. In another embodiment of the present disclosure, the content rating certificate appears on the occurrence of the event.

In yet another embodiment of the present disclosure, the position of the content rating certification changes from a first pre-defined area to a second pre-defined area on the occurrence of the event. In an embodiment of the present disclosure, the content rating certification may or may not be visible for the scheduled programs. In general, the content rating certification is not shown or displayed for the one or more scheduled programs. In an embodiment of the present disclosure, the content rating certification is displayed for the one or more advertisements only.

Going further, the advertisement detection system 106 includes a first processing unit 108 and a second processing unit 110. The advertisement detection system 106 has a built in media splitter configured to copy and transmit the media content synchronously to the first processing unit 108 and the second processing unit 110 in the real time. The first processing unit 108 includes a first central processing unit and associated peripherals for unsupervised detection of the one or more advertisements (also shown in FIG. 1B). The first processing unit 108 is connected to a first database 108a.

The first processing unit 108 is programmed to perform extraction of a first set of audio fingerprints and a first set of video fingerprints corresponding to the media content broadcasted on the channel. The first set of video fingerprints and the first set of audio fingerprints are extracted sequentially in the real time. The extraction of the first set of video fingerprints is done by sequentially extracting one or more prominent fingerprints corresponding to one or more prominent frames present in the media content. The one or more prominent frames correspond to the pre-defined interval of broadcast.

For example, let the media content be related to a channel say, X. The channel X broadcasts a 1 hour drama show between 10 AM to 11 AM. Suppose the media content is broadcasted on the channel X with a frame rate of 25 frames per second (hereinafter "fps"). Again let us assume that the channel X administrator has placed 5 advertisements in between 1 hour broadcast of the drama show. The first processing unit 108 separates audio and video from the media content corresponding to the drama show in the real time. Further, the first processing unit 108 sets a pre-defined range of time to approximate duration of play of every advertisement. Let us suppose the pre-defined range of time is between 10 seconds to 35 seconds. The first processing unit 108 processes each frame of the pre-defined number of frames of the 1 hour long drama show. The first processing unit 108 filters and selects prominent frames having dissimilar scenes. The first processing unit 108 extracts relevant characteristics corresponding to each prominent frame. The relevant characteristics constitute a digital video fingerprint. Similarly, the first processing unit 108 extracts the first set of audio fingerprints corresponding to the media content.

Furthermore, each of the one or more prominent fingerprints corresponds to a prominent frame having sufficient contrasting features compared to an adjacent prominent frame. For example, let us suppose that the first processing unit 108 select 5 prominent frames per second from 25 frames per second. Each pair of adjacent frames of the 5 prominent frames will have evident contrasting features. The first processing unit 108 generates a set of digital signature values corresponding to an extracted set of video fingerprints. The first processing unit 108 generates each digital signature value of the set of digital signature values by dividing each prominent frame of the one or more prominent frames into a pre-defined number of blocks. In an embodiment of the present disclosure, the predefined number of block is 16 (4×4). In another embodiment of the present disclosure, the pre-defined number of blocks is any suitable number. Each block of the pre-defined number of blocks has a pre-defined number of pixels. Each pixel is fundamentally a combination of red (hereinafter "R"), green (hereinafter "G") and blue (hereinafter "B") colors. The colors are collectively referred to as RGB. Each color of a pixel (RGB) has a pre-defined value in a pre-defined range of values. The predefined range of values is 0-255.

In an example, the RGB for the pixel has value of 000000. The color of pixel is black. In another example, the RGB for the pixel has a value of FFFFFF (255; 255; 255). The color of the pixel is white. Here, FF is hexadecimal equivalent of decimal, 255. In yet another example, the RGB for the pixel has a value of CCCC00 (204; 204; 0). The color of the pixel is yellow. The first processing unit 108 gray-scales each block of each prominent frame of the one or more prominent frames. The gray-scaling of each block is a conversion of RGB to monochromatic shades of grey color. Here 0 represents black and 255 represents white. Further, the first processing unit 108 calculates a first bit value and a second bit value for each block of the prominent frame. The first bit value and the second bit value are calculated from comparing a mean and a variance for the pre-defined number of pixels in each block of the prominent frame with a corresponding mean and variance for a master frame in the master database 114. The first processing unit 108 assigns the first bit value and the second bit with a binary 0 when the mean and the variance for each block of the prominent frame is less the corresponding mean and variance of each master frame. The first processing unit 108 assigns the first bit value and the second bit value with a binary 1 when the mean and the variance for each block is greater than the corresponding mean and variance of each master frame.

Furthermore, the first processing unit 108 obtains a 32 bit digital signature value corresponding to each prominent frame. The 32 bit digital signature value is obtained by sequentially arranging the first bit value and the second bit value for each block of the pre-defined number of blocks of the prominent frame. The first processing unit 108 stores each digital signature value corresponding to each prominent frame of the one or more prominent frames in the first database 108a. The digital signature value corresponds to the one or more programs and the one or more advertisements.

Further, the first processing unit 108 utilizes the one or more characteristics of the one or more properties of the channel for the detection of the one or more advertisements in the real time. The first processing unit 108 receives the live feed associated with the media content broadcasted on the channel in the real time. Accordingly, the first processing unit 108 derives the one or more characteristics of the one or more properties associated with the channel in the real time. The one or more characteristics are derived by performing a scale invariant feature transform algorithm. Also, the derivation is done in the real time.

In general, the scale invariant feature transform algorithm detects and describes local features in images. The scale invariant feature transform algorithm extracts the one or more characteristics of the one or more properties of the channel in the real time. In an embodiment of the present disclosure, the first processing unit 108 extracts a pre-determined number of the one or more features. The pre-determined number of the one or more features is in a range of 30-40. In an embodiment of the present disclosure, the scale invariant feature transform algorithm runs on each prominent video frame of the one or more prominent video frames extracted by the first processing unit 108. In an embodiment of the present disclosure, the scale invariant feature transform algorithm extracts the one or more characteristics for the logo and the content rating certification simultaneously. The first processing unit 108 stores the derived one or more characteristics associated with the one or more properties associated with the channel. In addition, the first processing unit 108 stores the first set of audio fingerprints, the first set of video fingerprints and the set of digital signature values corresponding to the extracted first set of video fingerprints. The storage is done in the first database 108a.

The first processing unit 108 determines the first one or more pre-defined regions associated with the display of the logo associated with the channel. In addition, the first processing unit 108 determines the second one or more pre-defined regions associated with the display of the content rating certification associated with the media content broadcasted on the channel. In an embodiment of the present disclosure, information associated with the first one or more pre-defined regions and the second one or more pre-defined regions is pre-stored in the master database 114. The advertisement detection system 106 is associated with an administrator 112. In an embodiment of the present disclosure, the first one or more pre-defined regions and the second one or more pre-defined regions are defined and stored in the master database 114 by the administrator 112. Also, in an embodiment of the present disclosure, the master database 114 includes information associated with the one or more characteristics of the one or more properties of the one or more channels 104. In an embodiment of the present disclosure, the information is stored for detection of new advertisements.

In an embodiment of the present disclosure, the first processing unit 108 extracts the one or more characteristics from the first one or more pre-defined regions and the second one or more pre-defined regions. Accordingly, the first processing unit 108 analyzes the derived one or more characteristics of the one or more properties of the channel. In an embodiment of the present disclosure, the analysis is done for noticing the change in the one or more characteristics associated with the one or more properties of the channel. In addition, the analysis is done in the first one or more pre-defined regions and the second one or more pre-defined regions only. Each prominent frame of the one or more prominent frames is analyzed sequentially for noticing the change in the one or more characteristics.

In an embodiment of the present disclosure, the change is noticed in the one or more features of the logo of the channel in the first region of the first one or more pre-defined regions. In an embodiment of the present disclosure, the analysis is done in each of the first one or more pre-defined regions at same time. In an embodiment of the present disclosure, the analysis is done in each of the first one or more pre-defined regions and each of the second one or more pre-defined regions at the same time. In an embodiment of the present disclosure, the analysis is done in the first one or more pre-defined regions only. In another embodiment of the present disclosure, the analysis is done in the second one or more pre-defined regions only. The analysis is done in the second one or more pre-defined regions when the analysis done in the first one or more pre-defined regions does not provide a desired result. The desired result corresponds to positive detection of the one or more advertisements on the channel.

Going further, the first processing unit 108 matches the derived one or more characteristics associated with the one or more properties with the stored one or more characteristics. The stored one or more characteristics are stored in the master database 114. The matching is done between each prominent video frame with a subsequent prominent video frame. Also, the matching is done at the first one or more pre-defined regions and the second one or more pre-defined regions on each of the one or more prominent frames. In an embodiment of the present disclosure, the first processing unit 108 matches the derived one or more characteristics stored in the first database 108a with the stored one or more characteristics in the master database 114. In an embodiment of the present disclosure, the first processing unit 108 performs the feature based matching.

Accordingly, the first processing unit 108 detects the one or more advertisements in the media content broadcasted on the channel. The detection is based on a result of the matching. The detection of the one or more advertisements is positive when the change in the one or more characteristics of the one or more properties is noticed. In addition, the detection is positive when a pre-determined number of characteristics derived in the real time match with a corresponding stored pre-determined number of characteristics. The pre-determined number of characteristics of the derived one or more characteristics associated with the one or more properties are stored in the first database 108a. The stored pre-determined number of characteristics of the stored one or more characteristics associated with the one or more properties are stored in the master database 114. In an embodiment of the present disclosure, the pre-determined number of the one or more characteristics is in a range of 7-8.

Further, the detection is positive based on occurrence of event in the first one or more pre-defined regions and the second one or more pre-defined regions. In an embodiment of the present disclosure, the event in the first one or more pre-defined regions is at least one of fading of the one or more colors associated with the logo, change in position of the logo and change in size of the logo. In addition, the event is at least one of a change in the shape of the logo, disappearance of the logo, decrease in the brightness level of the logo, increase in the brightness level of the logo and change in the one or more curves in the logo. The event in the second one or more pre-defined regions is at least one of appearance of the rating certificate, change in position of the rating certificate and a change in the type of the rating certificate.

Further, the detection of the one or more advertisements is done based on at least one of the logo associated with the channel and the content rating certification of the media content broadcasted on the channel. The detection is done based on the content rating certification when the logo associated with the channel is small and transparent. For example, a logo L of a channel A is too small and transparent such that the first processing unit 108 cannot derive the one or more features of the logo L in order to detect any advertisement on the channel A. Accordingly, the first processing unit 108 performs rating based detection for the detection of any advertisement on the channel A.

In an embodiment of the present disclosure, the detection of the one or more advertisements is done based on the logo associated with the channel and the content rating certification simultaneously. In an embodiment of the present disclosure, the first processing unit 108 matches the first set of characteristics on the corresponding first one or more pre-defined regions for each prominent frame with the subsequent prominent frame. In an embodiment of the present disclosure, the first processing unit 108 matches the second set of characteristics on the corresponding second one or more pre-defined regions for each prominent frame with the subsequent prominent frame.

In an embodiment of the present disclosure, the first processing unit 108 performs the unsupervised detection. The unsupervised detection corresponds to the detection of the advertisements which appear for a first time. In an embodiment of the present disclosure, the first processing unit 108 takes the set of digital signature values for the one or more prominent frames for which the logo based detection and the rating based detection is positive. The first processing unit 108 reports the detected one or more advertisements. The reported one or more advertisements are stored in a temporary reporting database.

The advertisement detection system 106 sends an audio and a video for each detected advertisement of the one or more advertisements to the administrator 112. The audio and the video are sent when any advertisement has been reported for a second time. The audio and the video are not sent when the advertisement is reported for more than the second time. Also, the advertisement detection system 108 sends the first set of audio fingerprints and the set of digital signature values corresponding to the first set of video fingerprints. Here, the first set of video fingerprints correspond to fingerprints for the one or more prominent frames of the detected one or more advertisements.

Accordingly, the administrator 112 checks the audio and the video and determines whether the audio and the video correspond to the advertisement or not. The check is performed in order to avoid any false positive detection. Further, the administrator 112 enters a metadata for each detected advertisement appearing for the first time. The metadata is stored in the master database 114 along with the first set of audio fingerprints and the set of digital signature values.

In an embodiment of the present disclosure, the first processing unit 108 utilizes a temporal recurrence algorithm for the unsupervised detection of the one or more advertisements. In temporal recurrence algorithm, the first processing unit 108 probabilistically matches a first pre-defined number of digital signature values with a stored set of digital signature values present in the first database 108a. In an example, let us suppose that the first processing unit 108 generates 100 digital signature values corresponding to 100 prominent frames in the first database 108a. The first processing unit 108 probabilistically matches 20 digital signature values corresponding to $101^{st}$ to $121^{st}$ prominent frame with each 20 digital signature values corresponding to 100 previously stored prominent frames.

The probabilistic match of the first pre-defined number of digital signature values sequentially for each of the prominent frame is performed by utilizing a sliding window algorithm. In an embodiment of the present disclosure, the first pre-defined number of digital signature values of the set of digital signature values for the unsupervised detection of the one or more advertisements is 20. The first processing unit 108 determines a positive probabilistic match of the pre-defined number of prominent frames based on a pre-defined condition. The pre-defined condition includes a pre-defined range of positive matches corresponding to probabilistically match digital signature values and a pre-defined duration of media content corresponding to the positive match. In addition, the pre-defined condition includes a sequence and an order of the positive matches and a degree of match of a pre-defined range of number of bits of the first pre-defined number of digital signature values. In an embodiment of the present disclosure, the pre-defined range of probabilistic matches corresponding to the positive match lies in a range of 40 matches to 300 matches. In another embodiment of the present disclosure, the pre-defined range of range of probabilistic matches corresponding to the positive match lies in a suitable duration of each advertisement running time. In an embodiment of the present disclosure, the first processing unit 108 discards the probabilistic matches corresponding to less than 40 positive matches.

Further, the pre-defined duration of media content corresponding to the positive match has a first limiting duration bounded by a second limiting duration. In an embodiment of the present disclosure, the first limiting duration is 10 seconds and the second limiting duration is 25 seconds. In another embodiment of the present disclosure, the first limiting duration is 10 seconds and the second limiting duration is 35 seconds. In yet another embodiment of the present disclosure, the first limiting duration is 10 seconds and the second limiting duration is 60 seconds. In yet another embodiment of the present disclosure, the first limiting duration is 10 seconds and the second limiting duration is 90 seconds. In yet another embodiment of the present disclosure, the first limiting duration and the second limiting duration may have any suitable limiting durations.

In an example, suppose 100 digital signature values from $1000^{th}$ prominent frame to $1100^{th}$ prominent frame gives a positive match with a stored $100^{th}$ frame to $200^{th}$ frame in the first database 108a. The first processing unit 108 checks whether the number of positive matches in the pre-defined range of positive matches and the positive matches correspond to media content in the first limiting duration and the second limiting duration. In addition, the first processing unit 108 checks whether the positive matches of 100 digital signature values for the unsupervised detection of the one or more advertisements is in a required sequence and order.

The first processing unit 108 checks for the degree of match of the pre-defined range of number of bits of the first pre-defined number of signature values. In an example, the degree of match of 640 bits (32 Bits×20 digital signature values) of the generated set of digital signature values with stored 640 digital signature values is 620 bits. In such case, the first processing unit 108 flags the probabilistic match as the positive match. In another example, the degree of match of 640 bits of the generated set of digital signature values with stored 640 digital signature values is 550 bits. In such case, the first processing unit 108 flags the probabilistic match as the negative match. In an embodiment of the present disclosure, the pre-defined range of number of bits is 0-40.

In an embodiment of the present disclosure, the first processing unit 108 generates one or more prominent frequencies and one or more prominent amplitudes from the extracted first set of audio fingerprints. The first processing unit 108 fetches a sample rate of the first set of audio fingerprints. The sample rate is divided by a pre-defined bin size set for the audio. The division of the sample rate by the pre-defined bin size provides the data point. Further, the first processing unit 108 performs fast fourier transform (hereinafter "FFT") on each bin size of the audio to obtain the one or more prominent frequencies and the one or more prominent amplitudes. The first processing unit 108 compares the one or more prominent frequencies and the one or more prominent amplitudes with a stored one or more prominent frequencies and a stored one or more prominent amplitudes.

Going further, the first processing unit 108 fetches the corresponding video and audio clip associated to the probabilistically matched digital signature values. The administrator 112 is associated with a display device and a control and input interface. In addition, the display device is configured to display a graphical user interface (hereinafter "GUI") of an installed operating system. The administrator 112 checks for the presence of the audio and the video clip manually in the master database 114. The administrator 112 decides whether the audio clip and the video clip correspond to a new advertisement. The administrator 112 tags each audio clip and the video clip with a tag. The tag corresponds to a brand name associated with a detected advertisement. The administrator 112 stores the metadata of the probabilistically matched digital fingerprint values in the master database 114 (as stated above in the patent application).

In addition, the first processing unit 108 reports a positively matched digital signature values corresponding to each detected advertisement in the temporary reporting database present in the first database 108a. The first processing unit 108 discards any detected advertisement already reported in the reporting database (as described above I the patent application).

Going further, the second processing unit 110 includes a second central processing unit and associated peripherals for the supervised detection of the one or more advertisements (also shown in FIG. 1C). The second processing unit 110 is connected to a second database 110a. The second processing unit 110 is programmed to perform the extraction of the first set of audio fingerprints and the first set of video fingerprints corresponding to the media content broadcasted on the channel. The first set of video fingerprints and the first set of audio fingerprints are extracted sequentially in the real time. The extraction of the first set of video fingerprints is done by sequentially extracting the one or more prominent fingerprints corresponding to the one or more prominent frames for the pre-defined interval of broadcast.

Furthermore, each of the one or more prominent fingerprints corresponds to the prominent frame having sufficient contrasting features compared to the adjacent prominent frame. For example, let us suppose that the second processing unit 110 selects 6 prominent frames per second from 25 frames per second. Each pair of adjacent frames of the 6 prominent frames will have evident contrasting features. The second processing unit 110 generates the set of digital signature values corresponding to the extracted set of video fingerprints. The second processing unit 110 generates each digital signature value of the set of digital signature values by dividing each prominent frame of the one or more prominent frames into the pre-defined number of blocks. In an embodiment of the present disclosure, the predefined number of block is 16 (4×4). In another embodiment of the present disclosure, the pre-defined number of blocks is any suitable number. Each block of the pre-defined number of blocks has the pre-defined number of pixels. Each pixel is fundamentally the combination of R, G and B colors. The colors are collectively referred to as RGB. Each color of the pixel (RGB) has the pre-defined value in the pre-defined range of values. The predefined range of values is 0-255.

The second processing unit 110 gray-scales each block of each prominent frame of the one or more prominent frames. The second processing unit 110 calculates the first bit value and the second bit value for each block of the prominent frame. The first bit value and the second bit value are calculated from comparison of the mean and the variance for the pre-defined number of pixels with the corresponding mean and variance for the master frame. The master frame is present in the master database 114. The second processing unit 110 assigns the first bit value and the second bit with the binary 0 when the mean and the variance for each block are less the corresponding mean and variance of each master frame. The second processing unit 110 assigns the first bit value and the second bit value with the binary 1 when the mean and the variance for each block are greater than the corresponding mean and variance of each master frame.

The second processing unit 110 obtains the 32 bit digital signature value corresponding to each prominent frame. The 32 bit digital signature value is obtained by sequentially arranging the first bit value and the second bit value for each block of the pre-defined number of blocks of the prominent frame. The second processing unit 110 stores each digital signature value corresponding to each prominent frame of the one or more prominent frames in the second database 110a. The digital signature value corresponds to the one or more programs and the one or more advertisements.

Further, the second processing unit 110 utilizes the one or more characteristics of the one or more properties of the channel for the detection of the one or more advertisements in the real time. The second processing unit 110 receives the live feed associated with a media content broadcasted on the channel in the real time. Accordingly, the second processing unit 110 derives the one or more characteristics of the one or more properties associated with the channel in the real time. The one or more characteristics are derived by performing the scale invariant feature transform algorithm. Also, the derivation is done in the real time (as stated above in the patent application).

The second processing unit 110 stores the derived one or more characteristics associated with the one or more properties associated with the channel. In addition, the second processing unit 110 stores the first set of audio fingerprints, the first set of video fingerprints and the set of digital signature values corresponding to the extracted first set of video fingerprints. The storage is done in the second database 110a. Further, the second processing unit 110 determines the first one or more pre-defined regions associated with the display of the logo associated with the channel. In addition, the second processing unit 110 determines the second one or more pre-defined regions associated with the display of the content rating certification associated with the media content broadcasted on the channel. In an embodiment of the present disclosure, information associated with the first one or more pre-defined regions and the second one or more pre-defined regions is pre-stored in the master database 114. In an embodiment of the present disclosure, the first one or more pre-defined regions and the second one or more pre-defined regions are defined and stored in the master database 114 by the administrator 112. Also, in an embodiment of the present disclosure, the master database 114 includes the information associated with the one or more characteristics of the one or more properties of the one or more channels 104. In an embodiment of the present disclosure, the information is stored for detection of advertisements appearing again on the channel after some time. In an embodiment of the present disclosure, the information is stored for detection of one or more advertisements which have been broadcasted in the past.

In an embodiment of the present disclosure, the second processing unit 110 extracts the one or more characteristics from the first one or more pre-defined regions and the second one or more pre-defined regions. Accordingly, the second processing unit 110 analyzes the derived one or more characteristics of the one or more properties of the channel. In an embodiment of the present disclosure, the analysis is done for noticing the change in the one or more characteristics associated with the one or more properties of the channel (as previously described above in the patent application). In addition, the analysis is done in the first one or more pre-defined regions and the second one or more pre-defined regions only. Each prominent frame of the one or more prominent frames is analyzed sequentially for noticing the change in the one or more characteristics.

In an embodiment of the present disclosure, the change is noticed in the one or more features of the logo of the channel in the first region of the first one or more pre-defined regions. In an embodiment of the present disclosure, the analysis is done in each of the first one or more pre-defined regions at same time. In an embodiment of the present disclosure, the analysis is done in each of the first one or more pre-defined regions and each of the second one or more pre-defined regions at the same time. In an embodiment of the present disclosure, the analysis is done in the first one or more pre-defined regions only. In another embodiment of the present disclosure, the analysis is done in the second one or more pre-defined regions only. The analysis is done in the second one or more pre-defined regions when the analysis done in the first one or more pre-defined regions does not provide a desired result. The desired result corresponds to positive detection of the one or more advertisements on the channel.

Going further, the second processing unit 110 matches the derived one or more characteristics associated with the one or more properties with the stored one or more characteristics. The stored one or more characteristics are stored in the master database 114. The matching is done between each prominent video frame with the subsequent prominent video frame. Also, the matching is done at the first one or more pre-defined regions and the second one or more pre-defined regions on each of the one or more prominent frames (as explained above). In an embodiment of the present disclosure, the second processing unit 110 performs the feature based matching.

Accordingly, the second processing unit 110 detects the one or more advertisements in the media content broadcasted on the channel. The detection is based on the result of the matching. The detection of the one or more advertisements is positive when the change in the one or more characteristics of the one or more properties is noticed. In addition, the detection is positive when the pre-determined number of characteristics derived in the real time match with the corresponding stored pre-determined number of characteristics (as stated above in the patent application). In an embodiment of the present disclosure, the pre-determined number of the one or more characteristics is in the range of 7-8.

Further, the detection of the one or more advertisements is done based on at least one of the logo associated with the channel and the content rating certification of the media content broadcasted on the channel. The detection is done based on the content rating certification when the logo associated with the channel is small and transparent (as explained above in the patent application). In an embodiment of the present disclosure, the detection of the one or more advertisements is done based on the logo associated with the channel and the content rating certification simultaneously. In an embodiment of the present disclosure, the second processing unit 110 matches the first set of characteristics on the corresponding first one or more pre-defined regions for each prominent frame with the subsequent prominent frame. In an embodiment of the present disclosure, the second processing unit 110 matches the second set of characteristics on the corresponding second one or more pre-defined regions for each prominent frame with the subsequent prominent frame.

The second processing unit 110 performs the supervised detection of the one or more advertisements. In an embodiment of the present disclosure, the second processing unit 110 probabilistically matches a second pre-defined number of digital signature values with the stored set of digital signature values present in the master database 114. The second pre-defined number of digital signature values corresponds to the second pre-defined number of prominent frames of the real time broadcasted media content. The probabilistic match is performed for the set of digital signature values by utilizing a sliding window algorithm. The second processing unit 110 determines the positive match in the probabilistically matching of the second pre-defined number of digital signature values with the stored set of digital signature values. The stored set of digital signal values is present in the master database 114. In an embodiment of the present disclosure, the second pre-defined number of digital signature values of the set of digital signature values for the supervised detection of the one or more advertisements is 6. In another embodiment of the present disclosure, the second pre-defined number of digital signature values is selected based on optimal processing capacity and performance of the second processing unit 110. In an embodiment of the present disclosure, the probabilistic matching is done for checking whether the one or more advertisements detected through the logo based detection and the rating based detection have appeared earlier or not.

In an example, let us suppose that the second processing unit 110 stores 300 digital signature values corresponding to 300 prominent frames in the second database 110$a$ for 10 seconds of the media content. The second processing unit 110 probabilistically matches 6 digital signature values corresponding to $101^{st}$ to $107^{st}$ prominent frame with each 6 digital signature values corresponding to 300 previously stored prominent frames. The 300 previously stored prominent frames are present in the master database 114.

In another example, suppose 300 digital signature values from $500^{th}$ prominent frame to $800^{th}$ prominent frame gives a positive match with a stored $150^{th}$ frame to $450^{th}$ frame in the master database 114. The second processing unit 110 checks whether the number of positive matches is in the pre-defined range of positive matches and the positive matches correspond to media content in the first limiting duration and the second limiting duration. In addition, the second processing unit 110 checks whether the positive matches of 300 digital signature values for the supervised detection of the one or more advertisements is in the required sequence and order.

The second processing unit 110 checks for the degree of match of the pre-defined range of number of bits of the second pre-defined number of signature values. In an example, the degree of match of 192 bits of the generated set of digital signature values with stored 192 digital signature values is 185 bits. In such case, the second processing unit 110 flags the probabilistic match as the positive match. In another example, the degree of match of 192 bits of the generated set of digital signature values with stored 192 digital signature values is 179 bits. In such case, the second processing unit 110 flags the probabilistic match as the negative match. In an embodiment of the present disclosure, the pre-defined range of number of bits is 0-12.

The second processing unit 110 compares the one or more prominent frequencies and the one or more prominent amplitudes with the stored one or more prominent frequencies and the stored one or more prominent amplitudes. The one or more prominent frequencies and the one or more prominent amplitudes correspond to the extracted first set of audio fingerprints. In an embodiment of the present disclosure, the administrator 112 manually checks whether each supervised advertisement detected is an advertisement or a program.

In an embodiment of the present disclosure, the advertisement detection system 106 reports a frequency of each advertisement broadcasted for a first time and a frequency of each advertisement broadcasted repetitively. In another embodiment of the present disclosure, the administrator 112 reports the frequency of each advertisement broadcasted for the first time and the frequency of each advertisement broadcasted repetitively.

Further, the master database 114 is present in a master server. The master database 114 includes a plurality of digital video and audio fingerprint records and every signature value corresponding to each previously detected and newly detected advertisement. The master database 114 is connected to the advertisement detection system 106. In an embodiment of the present disclosure, the master server is present in a remote location. In another embodiment of the present disclosure, the master server is present locally with the advertisement detection system 106.

Further, the advertisement detection system 106 stores the generated set of digital signature values, the first set of audio fingerprints and the first set of video fingerprints in the first database 108a and the second database 110a. Furthermore, the advertisement detection system 106 updates the metadata manually in the master database 114 for the unsupervised detection of the one or more advertisements. The metadata includes the set of digital signature values and the first set of video fingerprints. In addition, the advertisement detection system 106 stores the derived one or more characteristics of the one or more properties associated with the channel.

It may be noted that in FIG. 1A, FIG. 1B and FIG. 1C, the system 100 includes the broadcast reception device 102 for decoding one channel; however, those skilled in the art would appreciate the system 100 includes more number of broadcast reception devices for decoding more number of channels. It may be noted that in FIG. 1A, FIG. 1B and FIG. 1C, the system 100 includes the advertisement detection system 106 for the supervised and the unsupervised detection of the one or more advertisement corresponding to one channel; however, those skilled in the art would appreciate that the advertisement detection system 106 detects the one or more advertisements corresponding to more number of channels. It may be noted that in FIG. 1A, FIG. 1B and FIG. 1C, the administrator 112 manually checks each newly detected advertisement in the master database 114; however, those skilled in the art would appreciate that the advertisement detection system 106 automatically checks for each advertisement in the master database 114.

FIG. 2 illustrates a block diagram 200 of the advertisement detection system 106, in accordance with various embodiments of the present disclosure. It may be noted that to explain the system elements of the FIG. 2, references will be made to the system elements of the FIG. 1A, FIG. 1B and FIG. 1C. The block diagram 200 describes the advertisement detection system 106 configured for the unsupervised and the supervised detection of the one or more advertisements. The advertisement detection system 106 utilizes the one or more characteristics of the one or more properties of the channel for the detection of the one or more advertisements.

The block diagram 200 of the advertisement detection system 106 includes a receiving module 202, an extraction module 204, a generation module 206, a determination module 208, a derivation module 210, a storage module 212, an analyzing engine 214, a matching module 216, a detection module 218 and an updation engine 220. The receiving module 202 receives the live feed associated with a media content broadcasted on the channel in the real time. The extraction module 204 extracts the first set of audio fingerprints and the first set of video fingerprints corresponding to the media content broadcasted on the channel. The first set of audio fingerprints and the first set of video fingerprints are extracted sequentially in the real time (as shown in detailed description of FIG. 1A).

Further, the generation module 206 generates the set of digital signature values corresponding to the extracted set of video fingerprints. The generation module 206 generates each digital signature value of the set of digital signature values by dividing and grayscaling each prominent frame into the pre-defined number of blocks. Further, the generation module 206 calculates and obtains each digital signature value corresponding to each block of the prominent frame (as shown in detailed description of FIG. 1A). The generation module 206 includes a division module 206a, a grayscaling module 206b, a calculation module 206c and an obtaining module 206d. The division module 206a divides each prominent frame of the one or more prominent frames into the pre-defined number of blocks (as shown in detailed description of FIG. 1A). The grayscaling module 206b grayscales each block of each prominent frame of the one or more prominent frames. The calculation module 206c calculates the first bit value and the second bit value for each block of the prominent frame (as described in the detailed description of FIG. 1A). The obtaining module 206d obtains the 32 bit digital signature value corresponding to each prominent frame (as described in detailed description of FIG. 1A).

Further, the determination module 208 determines the first one or more pre-defined regions associated with the display of the logo associated with the channel. In addition, the determination module 208 determines the second one or more pre-defined regions associated with the display of the content rating certification associated with the media content broadcasted on the channel (as explained above in the detailed description of the FIG. 1A). The derivation module 210 derives the one or more characteristics associated with the one or more properties associated with the channel in the real time. The one or more characteristics are derived by performing the scale invariant feature transform algorithm (as stated above in the detailed description of the FIG. 1A).

The storage module 212 stores the derived one or more characteristics associated with the one or more properties associated with the channel and the first set of audio fingerprints. In addition, the storage module 212 stores the first set of video fingerprints and the set of digital signature values corresponding to the extracted first set of video fingerprints. The storage is done in the first database 108a and the second database 110a (as described in detailed description of FIG. 1A). Further, the analyzing engine 214 analyzes the one or more characteristics associated with the one or more properties associated with the channel in the real time. The analysis is done for noticing the change in the one or more characteristics associated with the one or more properties of the channel in the first one or more pre-defined regions and the second one or more pre-defined regions. Each prominent frame of the one or more prominent frames is analyzed sequentially for noticing the change in the one or more characteristics (as stated above in the detailed description of the FIG. 1A).

Furthermore, the matching module 216 matches the derived one or more characteristics in the real time with the stored one or more characteristics in the master database 114. The matching is done at the first one or more pre-defined regions and the second one or more pre-defined regions on each of the one or more prominent frames (as explained above in the detailed description of the FIG. 1A). Accordingly, the detection module 218 detects the one or more advertisements broadcasted on the channel. The detection is based on the result of the matching. The detection of the one or more advertisements is positive when the change in the one or more characteristics of the one or more properties is noticed. The detection is positive based on the occurrence of event in the first one or more pre-defined regions and the second one or more pre-defined regions (as described above in the detailed description of the FIG. 1A).

In an embodiment of the present disclosure, the detection of the one or more advertisements is done based on at least one of the logo associated with the channel and the content rating certification of the media content broadcasted on the channel. In an embodiment of the present disclosure, the detection is done based on the content rating certification when the logo associated with the channel is small and transparent. In another embodiment of the present disclosure, the detection of the one or more advertisements is done based on the logo associated with the channel and the content rating certification of the media content broadcasted on the channel simultaneously (as described above in the detailed description of the FIG. 1A).

In an embodiment of the present disclosure, the detection module 218 includes an unsupervised detection module and a supervised detection module. The unsupervised detection module detects the new advertisement through unsupervised machine learning. The unsupervised detection module probabilistically matches the first pre-defined number of digital signature values corresponding to the pre-defined number of prominent frames with the stored set of digital signature values (as described in detailed description of FIG. 1A).

Furthermore, the unsupervised detection module compares the one or more prominent frequencies and the one or more prominent amplitudes of the extracted first set of audio fingerprints (as described in detailed description of FIG. 1A). In addition, the unsupervised detection module determines the positive probabilistic match of the pre-defined number of prominent frames based on the pre-defined condition (as described in the detailed description of FIG. 1A). Moreover, the unsupervised detection module fetches the video and the audio clip corresponding to the probabilistically matched digital signature values (as described in the detailed description of FIG. 1A). Further, the unsupervised detection module checks presence of the audio and the video clip manually in the master database 114 (as described in detailed description of FIG. 1A). In addition, the unsupervised detection module reports the positively matched digital signature values corresponding to the advertisement of the one or more advertisements in the reporting database present in the first database 108a (as described in the detailed description of FIG. 1A).

The supervised detection module probabilistically matches the second pre-defined number of digital signature values with the stored set of digital signature values present in the master database 114 (as described above in the detailed description of FIG. 1A). Further, the supervised detection module compares the one or more prominent frequencies and the one or more prominent amplitudes with the stored one or more prominent frequencies and the stored one or more prominent amplitudes (as described in the detailed description of FIG. 1A). The supervised detection module determines the positive match in the probabilistically matching of the second pre-defined number of digital signature values with the stored set of digital signature values in the master database 114. In addition, the supervised detection module determines the positive match from the comparison of the one or more prominent frequencies with the stored one or more prominent frequencies (as described in the detailed description of FIG. 1A).

Going further, the updation engine 220 updates the derived one or more characteristics of the one or more properties associated with the channel and the first set of video fingerprints. In addition, the updation engine 220 updates the set of digital signature values for the detected one or more advertisements in the master database 114. Also, the updation engine 220 updates the metadata manually in the master database 114 for the unsupervised detection of the one or more advertisements. The metadata includes the set of digital signature values and the first set of video fingerprints corresponding to the detected advertisement (as described in the detailed description of FIG. 1A).

FIG. 3 illustrates a flow chart 300 for the detection of the one or more advertisements broadcasted on the channel, in accordance with various embodiments of the present disclosure. It may be noted that to explain the process steps of the flowchart 300, references will be made to the system elements of the FIG. 1A, FIG. 1B, FIG. 1C and FIG. 2.

The flowchart 300 initiates at step 302. At step 304, the receiving module 202 receives the live feed associated with the media content broadcasted on the channel in the real time. At step 306, the derivation module 210 derives the one or more characteristics associated with the one or more properties associated with the channel in the real time. The one or more characteristics are derived by performing the scale invariant feature transform algorithm. At step 308, the analyzing engine 214 analyzes the one or more characteristics associated with the one or more properties associated with the channel in the real time. The analysis is done for noticing the change in the one or more characteristics associated with the one or more properties of the channel in the first one or more pre-defined regions and the second one or more pre-defined regions. At step 310, the matching module 216 matches the one or more characteristics associated with the one or more properties derived in the real time with stored one or more characteristics associated with the one or more properties. Further, at step 312, the detection module 218 detects the one or more advertisements broadcasted on the channel. The flow chart 300 terminates at step 314.

It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more buses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The present disclosure has numerous disadvantages over the prior art. The present disclosure provides a novel method to detect any new advertisement running for the first time on any television channel. The advertisements are detected robustly and dedicated supervised and unsupervised central processing unit (hereinafter "CPU") are installed. Further, the present disclosure provides a method and system that is economic and provides high return of investment. The detection of each repeated advertisement on supervised CPU and each new advertisement on unsupervised CPU significantly saves processing power and saves significant time.

The disclosure provides a cost efficient solution to a scaled mapping and database for advertisement broadcast.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for detecting one or more advertisements broadcasted on a channel in real time, the computer-implemented method comprising:

receiving, at an advertisement detection system with a processor, a live feed associated with a media content broadcasted on the channel in real time;

deriving, at the advertisement detection system with the processor, one or more characteristics associated with one or more properties associated with the channel in real time, wherein the one or more characteristics comprises a first set of characteristics associated with a logo of the channel and a second set of characteristics associated with a content rating certification associated with the media content broadcasted on the channel and wherein the one or more characteristics being derived by performing a scale invariant feature transform for each of one or more prominent frames;

analyzing, at the advertisement detection system with the processor, the one or more characteristics associated with the one or more properties associated with the channel in real time, the one or more characteristics being analyzed for noticing a change in the one or more characteristics associated with the one or more properties of the channel in first one or more pre-defined regions and second one or more pre-defined regions and wherein each prominent frame of the one or more prominent frames being analyzed sequentially for noticing the change in the one or more characteristics;

matching, at the advertisement detection system with the processor, the one or more characteristics associated with the one or more properties derived in the real time with stored one or more characteristics associated with the one or more properties, wherein the matching being done between each prominent video frame with a subsequent prominent video frame, wherein the matching being done at the first one or more pre-defined regions and the second one or more pre-defined regions on each of the one or more prominent frames; and detecting, at the advertisement detection system with the processor, the one or more advertisements broadcasted on the channel in the real time, wherein the one or more advertisements being detected based on a result of the matching, wherein the detection of the one or more advertisements being positive when a change in the one or more characteristics of the one or more properties being noticed, wherein the detection being positive when a pre-determined number of characteristics of the one or more characteristics of the one or more properties derived in the real time match with a corresponding stored pre-determined number of characteristics of the stored one or more characteristics of the one or more properties and wherein the detection being positive based on occurrence of event in the first one or more pre-defined regions and the second one or more pre-defined regions;

generating, at the advertisement detection system with the processor, a set of digital signature values corresponding to an extracted first set of video fingerprints, wherein the generating of each digital signature value of the set of digital signature values being done by:

dividing each prominent frame of one or more prominent frames into a pre-defined number of blocks, wherein each block of the pre-defined number of blocks having a pre-defined number of pixels;

grayscaling each block of each prominent frame of the one or more prominent frames;

calculating a first bit value and a second bit value for each block of the prominent frame, wherein the first bit value and the second bit value being calculated from comparing a mean and a variance for the pre-defined number of pixels in each block of the prominent frame with a corresponding mean and variance for a master frame in a master database; and obtaining a 32 bit digital signature value corresponding to each prominent frame, wherein the 32 bit digital signature value being obtained by sequentially arranging the first bit value and the second bit value for each block of the pre-defined number of blocks of the prominent frame.

2. The computer-implemented method as recited in claim 1, further comprising, extracting, at the advertisement detection system with the processor, a first set of audio fingerprints and a first set of video fingerprints corresponding to the media content broadcasted on the channel, wherein the first set of audio fingerprints and the first set of video fingerprints being extracted sequentially in real time, wherein the extraction of the first set of video fingerprints being done by sequentially extracting one or more prominent fingerprints corresponding to one or more prominent frames of a pre-defined number of frames present in the media content for a pre-defined interval of broadcast.

3. The computer-implemented method as recited in claim 1, wherein the first bit value and the second bit value being assigned a binary 0 when the mean and the variance for each block of the prominent frame being less than the corresponding mean and variance of each master frame and wherein the first bit value and the second bit value being assigned a binary 1 when the mean and the variance for each block of the prominent frame being greater than the corresponding mean and variance of each master frame.

4. The computer-implemented method as recited in claim 1, wherein the one or more properties associated with the channel comprises a logo associated with the channel and a content rating certification associated with the media content broadcasted on the channel.

5. The computer-implemented method as recited in claim 1, wherein the first set of characteristics comprises one or more features associated with the logo, wherein the one or more features comprises a position of the logo, a shape of the logo, one or more colors associated with the logo, a size of the logo, a brightness level associated with the logo, one or more characters in the logo and one or more curves associated with the logo, wherein the second set of characteristics associated with the content rating certification comprises a type of rating certificate allotted to the media content and a position associated with a display of the rating certificate and wherein the type of rating certificate comprises at least one of an adult rating, a restricted rating, universal adult rating, parental guidance rating and a strong parental guidance rating.

6. The computer-implemented method as recited in claim 1, further comprising determining, at the advertisement detection system with the processor, the first one or more pre-defined regions associated with a display of the logo associated with the channel and the second one or more pre-defined regions associated with a display of the content rating certification associated with the media content broadcasted on the channel.

7. The computer-implemented method as recited in claim 1, further comprising storing, at the advertisement detection system with the processor, the one or more characteristics associated with the one or more properties associated with the channel, the first set of audio fingerprints, the first set of video fingerprints and the set of digital signature values corresponding to the extracted first set of video fingerprints and wherein the storing being done in a first database and a second database.

8. The computer-implemented method as recited in claim 1, wherein the event in the first one or more pre-defined regions being at least one of fading of one or more colors associated with the logo, change in position of the logo, change in size of the logo, change in shape of the logo, disappearance of the logo, decrease in brightness level of the logo, increase in the brightness level of the logo and change in one or more curves in the logo and wherein the event in the second one or more pre-defined regions being at least one of detection of appearance of a rating certificate, change in position of the rating certificate and a change in type of the rating certificate.

9. The computer-implemented method as recited in claim 1, wherein the detection of the one or more advertisements being done based on at least one of a logo associated with the channel and a content rating certification of the media content broadcasted on the channel and wherein the detection being done based on the content rating certification when the logo associated with the channel being small and transparent.

10. The computer-implemented method as recited in claim 1, wherein the detection of the one or more advertisements being done based on logo associated with the channel and a content rating certification of the media content broadcasted on the channel simultaneously.

11. The computer-implemented method as recited in claim 1, further comprising, updating, at the advertisement detection system with the processor, a derived one or more characteristics of the one or more properties associated with the channel, the first set of video fingerprints and the set of digital signature values for a detected one or more advertisements in a master database.

12. A computer system comprising:
one or more processors; and
a memory coupled to the one or more processors, the memory for storing instructions which, when executed by the one or more processors, cause the one or more processors to perform a method for detecting one or more advertisements broadcasted on a channel in real time, the method comprising:
receiving, at an advertisement detection system, a live feed associated with a media content broadcasted on the channel in real time;
deriving, at the advertisement detection system, one or more characteristics associated with one or more properties associated with the channel in real time, wherein the one or more characteristics comprises a first set of characteristics associated with a logo of the channel and a second set of characteristics associated with a content rating certification associated with the media content broadcasted on the channel and wherein the one or more characteristics being derived by performing a scale invariant feature transform for each of one or more prominent frames;
analyzing, at the advertisement detection system, the one or more characteristics associated with the one or more properties associated with the channel in real time, the one or more characteristics being analyzed for noticing a change in the one or more characteristics associated with the one or more properties of the channel in first one or more pre-defined regions and second one or more pre-defined regions and wherein each prominent frame of the one or more prominent frames being analyzed sequentially for noticing the change in the one or more characteristics;
matching, at the advertisement detection system, the one or more characteristics associated with the one or more properties derived in the real time with stored one or more characteristics associated with the one or more properties, wherein the matching being done between each prominent video frame with a subsequent prominent video frame, wherein the matching being done at the first one or more pre-defined regions and the second one or more pre-defined regions on each of the one or more prominent frames; and
detecting, at the advertisement detection system, the one or more advertisements broadcasted on the channel in the real time, wherein the one or more advertisements being detected based on a result of the matching, wherein the detection of the one or more advertisements being positive when a change in the one or more characteristics of the one or more properties being noticed, wherein the detection being positive when a pre-determined number of characteristics of the one or more characteristics of the one or more properties derived in the real time match with a corresponding stored pre-determined number of characteristics of the stored one or more characteristics of the one or more properties and wherein the detection being positive based on occurrence of event in the first one or more pre-defined regions and the second one or more pre-defined regions;
generating, at the advertisement detection system, a set of digital signature values corresponding to an extracted first set of video fingerprints, wherein the generating of each digital signature value of the set of digital signature values being done by:

dividing each prominent frame of one or more prominent frames into a pre-defined number of blocks, wherein each block of the pre-defined number of blocks having a pre-defined number of pixels;
grayscaling each block of each prominent frame of the one or more prominent frames;
calculating a first bit value and a second bit value for each block of the prominent frame, wherein the first bit value and the second bit value being calculated from comparing a mean and a variance for the pre-defined number of pixels in each block of the prominent frame with a corresponding mean and variance for a master frame in a master database; and
obtaining a 32 bit digital signature value corresponding to each prominent frame, wherein the 32 bit digital signature value being obtained by sequentially arranging the first bit value and the second bit value for each block of the pre-defined number of blocks of the prominent frame.

13. The computer system as recited in claim 12, further comprising determining, at the advertisement detection system, the first one or more pre-defined regions associated with a display of a logo associated with the channel and the second one or more pre-defined regions associated with a display of a content rating certification associated with the media content broadcasted on the channel.

14. The computer system as recited in claim 12, wherein the first bit value and the second bit value being assigned a binary 0 when the mean and the variance for each block of the prominent frame being less the corresponding mean and variance of each master frame and wherein the first bit value and the second bit value being assigned a binary 1 when the mean and the variance for each block of the prominent frame being greater than the corresponding mean and variance of each master frame.

15. The computer system as recited in claim 12, wherein the detection of the one or more advertisements being done based on at least one of a logo associated with the channel and a content rating certification of the media content broadcasted on the channel and wherein the detection being done based on the content rating certification when the logo associated with the channel being small and transparent.

16. The computer system as recited in claim 12, wherein the detection of the one or more advertisements being done based on a logo associated with the channel and a content rating certification of the media content broadcasted on the channel simultaneously.

17. A non-transitory computer-readable storage medium encoding computer executable
instructions that, when executed by at least one processor, performs a method for detecting one or more advertisements broadcasted on a channel in real time, the method comprising:
receiving, at a computing device, a live feed associated with a media content broadcasted on the channel in real time;
deriving, at the computing device, one or more characteristics associated with one or more properties associated with the channel in real time, wherein the one or more characteristics comprises a first set of characteristics associated with a logo of the channel and a second set of characteristics associated with a content rating certification associated with the media content broadcasted on the channel and wherein the one or more characteristics being derived by performing a scale invariant feature transform for each of one or more prominent frames;

analyzing, at the computing device, the one or more characteristics associated with the one or more properties associated with the channel in real time, the one or more characteristics being analyzed for noticing a change in the one or more characteristics associated with the one or more properties of the channel in first one or more pre-defined regions and second one or more pre-defined regions and wherein each prominent frame of the one or more prominent frames being analyzed sequentially for noticing the change in the one or more characteristics;

matching, at the computing device, the one or more characteristics associated with the one or more properties derived in the real time with stored one or more characteristics associated with the one or more properties, wherein the matching being done between each prominent video frame with a subsequent prominent video frame, wherein the matching being done at the first one or more pre-defined regions and the second one or more pre-defined regions on each of the one or more prominent frames; and detecting, at the computing device, the one or more advertisements broadcasted on the channel in the real time, wherein the one or more advertisements being detected based on a result of the matching, wherein the detection of the one or more advertisements being positive when a change in the one or more characteristics of the one or more properties being noticed, wherein the detection being positive when a pre-determined number of characteristics of the one or more characteristics of the one or more properties derived in the real time match with a corresponding stored pre-determined number of characteristics of the stored one or more characteristics of the one or more properties and wherein the detection being positive based on occurrence of event in the first one or more pre-defined regions and the second one or more pre-defined regions;

generating, at the advertisement detection system with the processor, a set of digital signature values corresponding to an extracted first set of video fingerprints, wherein the generating of each digital signature value of the set of digital signature values being done by:

dividing each prominent frame of one or more prominent frames into a pre-defined number of blocks, wherein each block of the pre-defined number of blocks having a pre-defined number of pixels;

grayscaling each block of each prominent frame of the one or more prominent frames;

calculating a first bit value and a second bit value for each block of the prominent frame, wherein the first bit value and the second bit value being calculated from comparing a mean and a variance for the pre-defined number of pixels in each block of the prominent frame with a corresponding mean and variance for a master frame in a master database; and obtaining a 32 bit digital signature value corresponding to each prominent frame, wherein the 32 bit digital signature value being obtained by sequentially arranging the first bit value and the second bit value for each block of the pre-defined number of blocks of the prominent frame.

18. The computer-readable storage medium as recited in claim 17, further comprising determining, at the computing device, the first one or more pre-defined regions associated with a display of a logo associated with the channel and the second one or more pre-defined regions associated with a display of a content rating certification associated with the media content broadcasted on the channel.

* * * * *